United States Patent [19]

Kuroda et al.

[11] 4,371,679
[45] Feb. 1, 1983

[54] PROCESS FOR PREPARING POLYOLEFINS

[75] Inventors: Nobuyuki Kuroda, Yokohama; Akira Sano, Kawasaki; Toru Nakamura, Kawasaki; Kazuo Matsuura, Kawasaki; Mituji Miyoshi, Kanagawa, all of Japan

[73] Assignee: Nippon Oil Company, Ltd., Tokyo, Japan

[21] Appl. No.: 229,167

[22] Filed: Jan. 28, 1981

Related U.S. Application Data

[63] Continuation of Ser. No. 45,859, Jun. 6, 1979, abandoned.

[30] Foreign Application Priority Data

Jun. 21, 1978 [JP] Japan ................................. 53-74171

[51] Int. Cl.$^3$ ............................ C08F 4/02; C08F 4/64; C08F 4/58
[52] U.S. Cl. .................................... 526/116; 526/125; 526/128
[58] Field of Search ........................... 56/116, 125, 128

[56] References Cited

U.S. PATENT DOCUMENTS

| | | | |
|---|---|---|---|
| 3,987,233 | 10/1976 | Sato | 526/97 |
| 3,991,259 | 11/1976 | Piekarski | 526/97 |
| 4,093,789 | 6/1978 | Kuroda | 526/114 |
| 4,128,607 | 12/1978 | Shiomura | 526/75 |
| 4,220,554 | 9/1980 | Scata | 252/429 B |
| 4,223,118 | 9/1980 | Tsubaki | 526/128 |
| 4,237,254 | 12/1980 | Kitagawa | 526/125 |

*Primary Examiner*—C. A. Henderson
*Attorney, Agent, or Firm*—Wyatt, Gerber, Shoup, Scobey & Badie

[57] ABSTRACT

This invention provides a process for preparing polyolefins by polymerizing or copolymerizing olefins using as the catalyst a titanium compound-containing solid component and an organometal compound, said solid component comprising a substance obtained by copulverizing (1) magnesium halide and/or manganese halide, (2) an organic halide compound, (3) a chain or cyclic silicone compound with a recurring structural unit represented by the general formula

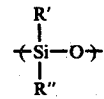

wherein R' and R" respectively represent a hydrogen, alkyl, aryl, alkoxy or hydroxyl group and (4) tetravalent and/or trivalent titanium compound(s).

15 Claims, No Drawings

PROCESS FOR PREPARING POLYOLEFINS

This is a continuation of application Ser. No. 045,859 filed June 6, 1979 now abandoned.

BACKGROUND OF THE INVENTION

1. Field of the Invention

This invention relates to novel catalysts for olefin polymerization. More particularly, it is concerned with a process for polymerizing olefins which comprises polymerizing or copolymerizing olefins in the presence of a catalyst which is composed of a solid substance obtained by copulverizing (1) magnesium halide and/or manganese halide, (2) an organic halide compound, (3) a chain or cyclic silicone compound with the recurring structural unit represented by the general formula

wherein R' and R" respectively represent a hydrogen, alkyl, aryl, alkoxy or hydroxy group, and (4) a titanium compound, said solid substance being combined with an organometal compound, thereby greatly increasing the polymer yield per solid as well as the polymer yield per transition metal and also very efficiently yielding polymers of high bulk density and good particle features thus excluding the need for a residual catalyst-removing step.

2. Description of the Prior Art

The prior art has utilized catalyst comprising a transition metal compound such as titanium compounds carried on magnesium halide which are known by Japanese patent publication No. 12105/1964, and other catalysts comprising copulverized magnesium halide and titanium tetrachloride which are known by Belgian Pat. No. 742,112.

However, as it is desirable from the polyolefin-production point of view that the polymerization activity be as high as possible and from the productivity point of view that the bulk density of the polymer product be as high as possible, the process according to the aforementioned Japanese patent publication is not satisfactory in that the bulk density of the polymer product as well as the polymerization activity are low. The process disclosed in Belgian Pat. No. 742,112 needs improvement in that, although the polymerization activity is high, the bulk density of the polymer product is low. In addition, whereas it is desirable from the polymer slurry-handling point of view as well as from the polymer particle-handling point of view that the polymer particles contain as little as possible of fine particles, for example, of a size of 100μ or smaller and coarse particles, for example, of a size of 1000μ or larger, the process of Belgian Pat. No. 742,112 needs improvement in that the catalysts contain a large portion of fine particles. We have previously proposed that polymers of high bulk density can be obtained by combining a solid obtained by copulverizing magnesium halide and/or manganese halide, an organic halide compound, and a titanium compound with an organoaluminum compound and/or an organozinc compound (Japanese patent public disclosure No. 42584/1977). Further improvement has been desired from the slurry-handling point of view for the above process in that coarse particles may be formed.

Summary of the Invention

A process for preparing novel polymerization catalysts has now been discovered which produces polymers of high bulk density and good particle features in a very high yield as well as an olefin polymerization or copolymerization process using said polymerization catalyst. According to the process of the invention there are provided methods for preparing polyolefins very economically of the whole in which monomer partial pressure is low during the polymerization due to the very high polymerization activity, productivity is increased due to the high bulk density of the polymer product and the catalyst-removing step can be omitted in the polymer preparation process due to the very low amount of residual catalyst formed following completion of the polymerization, thereby simplifying the polymer-handling step. In addition to the aforementioned advantages of the invention, there is mentioned an advantage that polymers with a wide distribution of the molecular weight are obtained as powders of a high bulk density and good particular properties.

Description of the Invention

Detailed description of the characteristics of the present invention will be given below.

As the magnesium halide used in the invention are mentioned magnesium chloride, magnesium fluoride, magnesium bromide, magnesium iodide and mixtures thereof. Magnesium chloride is particularly preferred.

The most preferred manganese halide used in the invention is manganese chloride. Mixtures of magnesium halide and manganese halide are also preferred in the present invention.

Organic halide compounds used in the invention include compounds in which one or more of the hydrogens in saturated or unsaturated aliphatic hydrocarbons, aromatic hydrocarbons and the like are substituted with halogens such as the mono-, di-, tri-substituted compounds and the like. The halogen may be any of fluorine, chlorine, bromine and iodine.

As the particular organic halide compounds may be mentioned methylene chloride, chloroform, carbon tetrachloride, bromochloromethane dichlorodifluoromethane, 1-bromo-2-chloroethane, 1,2-dibromo-1,1-dichloroethane, 1,1-dichloroethane, 1,2-dichloroethane, 1,2-dichloro-1,1,2,2-tetrafluoroethane, 1,1,2,2-tetrachloroethane, haxachloroethane, pentachloroethane, 1,1,1,2-tetrachloroethane, 1,1,1-trichloroethane, 1,1,2-trichloroethane, 1-chloropropane, 2-chloropropane, 1,2-dichloropropane, 1,3-dichloropropane, 2,2-dichloropropane, 1,1,1,2,2,3,3-heptachloropropane, 1,1,2,2,3,3-hexachloropropane, octachloropropane, 1,1,2-trichloropropane, 1-chlorobutane, 2-chlorobutane, 1-chloro-2-methylpropane, 2-chloro-2-methylpropane, 1,2-dichlorobutane, 1,3-dichlorobutane, 1,4-dichlorobutane, 2,2-dichlorobutane, 1-chloropentane, 1-chlorohexane, 1-chloroheptane, 1-chlorooctane, 1-chlorononane, 1-chlorodecane, vinyl chloride, 1,1-dichloroethylene, 1,2-dichloroethylene, tetrachloroethylene, 3-chloro-1-propene, 1,3-dichloropropene, chloroprene, oleyl chloride, chlorobenzene, chloronaphthalene, benzyl chloride, benzylidene chloride, chloroethylbenzene, styrene dichloride, α-chlorocumene and the like, Preferably mentioned are organic halide compounds such as 1-bromo-2-chloroethane, 1,1-dichloroethane, 1,2-dichloroethane, hexachloroethane, 1-chloropropane, 2-chloropropane, 1,2-dichloropropane, 1,1-dichloroethylene, 1,2-dichloroethylene, chlorobenzene, benzyl chloride and the like.

The silicone compounds used in the present invention are chain or cyclic polysiloxanes having the recurring structural unit represented by the general formula

wherein R' and R" respectively represent a hydrogen, alkyl, aryl, alkoxy or hydroxyl group. No particular limits are placed on the degree of polymerization in the polysiloxanes. However, those which have a viscosity in the range from 1 to $10^6$ centistokes are usually employed. In particular, there may be mentioned tetramethyldisiloxane, tetramethylcyclotetrasiloxane, octamethyltrisiloxane, octaethylcyclotetrasiloxane, hexaphenylcyclotrisiloxane, methylhydropolysiloxane, ethylhydropolysiloxane, dimethylpolysiloxane, diethylpolysiloxane, methylethylpolysiloxane, methylphenylpolysiloxane, methylbenzylpolysiloxane, diethoxypolysiloxane and the like.

There is no particular limit set on the nature of the titanium compounds used in the invention. As the tetravalent titanium compounds are mentioned titanium tetrachloride, titanium tetrabromide, titanium tetraiodide, monoethoxytrichlorotitanium, diethoxydichlorotitanium, triethoxymonochlorotitanium, tetraethoxytitanium, monoisopropoxytrichlorotitanium, diisopropoxydichlorotitanium, tetraisopropoxytitanium, reaction products of silicone tetrachloride and titanium alkoxides, and mixtures thereof.

The trivalent titanium compounds used in the invention are not limited to a specific class, which include various titanium halides obtained by reducing titanium tetrahalides with hydrogen, aluminum, titanium or an organometal compound. Compounds obtained by reducing various tetravalent halogenated alkoxytitanium may also be mentioned. Mixtures of these compounds may of course be employed. Combined vanadium and titanium compounds are often applied in order to increase efficacy of the invention. A V/Ti molar ratio in the range from 2/1 to 0.01/1 is preferable.

Copulverization of the magnesium halide and/or manganese halide, organic halide compound, silicone compound and titanium compound may be of any order. The above-mentioned components may be pulverized all together, or the magnesium halide and/or manganese halide, organic halide compound and silicone compound may be copulverized first, followed by addition and copulverization of the titanium compound, or the magnesium halide and/or manganese halide and titanium compound may be copulverized first, followed by addition and copulverization of the organic halide compound and silicone compound, or a reaction product of the organic halide compound, silicone compound and titanium compound may be copulverized with the magnesium halide and/or manganese halide.

When a liquid titanium compound such as titanium tetrachloride is utilized, it is preferable copulymerize the necessary amount of the titanium compound carried on by copulverization to simplify of the procedures for synthesizing the catalyst, although it is feasible to contact the magnesium halide and/or manganese halide, organic halide compound and silicone compound previously copulverized with the liquid titanium compound and then remove the unreacted titanium compound by washing. Of course, these procedures should be carried out under an inert gas, and moisture should be maintained as low as possible.

No specific limits are given to the ratio of blending the magnesium halide and/or manganese halide and organic halide compound. Too large amount of the organic halide compound tends to reduce the polymerization activity, and too small amount would deteriorate the effect of addition of the organic halide compound. It is preferable to employ a weight ratio of the magnesium halide and/or magnesium halide:organic halide compound in the range from 1:0.5 to 1:0.01.

As for the ratio of blending the magnesium halide and/or manganese halide and silicone compound, too large or too small amount of the silicone compound would offset the advantages of the present invention. The magnesium halide and/or manganese halide: the silicone compound weight ratio is in the range from 1:0.5 to 1:0.005, and preferably from 1:0.3 to 1:0.01.

The amount of the titanium compound contained in the catalyst is most preferably adjusted to be within the range from 0.5 to 10% by weight in terms of the titanium contained in the solid product. The range from 1 to 8% by weight is particularly preferred in order to provide well-balanced activity per the titanium and activity per the solid.

Copulverization may be effected in any type of the apparatus. An apparatus such as ball mill, vibration mill, rod mill, impulse mill or the like is usually employed. Temperature and time of copulverization can easily be determined by those skilled in the art depending upon the way in which the copulverization is carried out. In general, the copulverization temperature is from 0° to 200° C., preferably from 20° to 100° C., and the copulverization time is from 0.5 to 50 hours, preferably from 1 to 30 hours.

The polymerization reaction of olefins using the catalyst of the present invention is carried out in the same way as the olefin polymerization reaction with the Ziegler-type catalyst. An atmosphere substantially free from oxygen or air is maintained throughout the reaction. The polymerization of olefins is effected under such conditions that the temperature is from 20° to 120° C., preferably from 50° to 100° C., and the pressure is from atmospheric pressure to 70 kg/cm$^2$G, preferably from 2 to 60 kg/cm$^2$G. Adjustment of the molecular weight can be achieved to some extent by changing the polymerization conditions such as the polymerization temperature and the molar ratio of the catalyst. However, this is effectively done by adding hydrogen to the polymerization system. Using the catalyst according to the invention, of course, two or more multistage polymerization reaction can be effected without difficulty in which polymerization conditions such as hydrogen concentration and polymerization temperature are varied. Whereas the polymerization of olefins with the catalyst of the invention is usually carried out in the presence of an inert hydrocarbon solvent, it is of course feasible to carry out the reaction in the absence of any inactive hydrocarbon solvent.

The process according to the present invention is applicable to polymerization of any of the olefins polymerizable with the Ziegler catalyst. The process is preferably used in homopolymerization of α-olefins such as ethylene, propylene or 1-butene as well as in copolymerization of ethylene-propylene, ethylene-1-butene, propylene-1-butene and the like.

As the organometal compound used in the present invention are mentioned organometal compounds of the metals of the Groups I–IV in the Periodic Table that are already known as components in Ziegler catalysts. Organoaluminum and organozinc compounds are particularly preferred. More specifically, they are organoaluminum compounds of the general formulae $R_3Al$, $R_2AlX$, $RAlX_2$, $R_2AlOR$, $RAl(OR)X$ and $R_3Al_2X_3$ wherein R may be the same or different and alkyl or aryl group, and X represents a halogen atom, or an organozinc compound of the general formula $R_2Zn$ wherein R may be the same or different alkyl group. For example, triethylaluminum, triisobutylaluminum, trihexylaluminum, trioctylaluminum, diethylaluminum chloride, ethylaluminum sesquichloride, diethylzinc and mixtures thereof are mentioned. There are no specific limits to the amount of these organometal compounds used in the invention. Usually, amounts from 0.1 to 1000 times in mole the amount of the transition metal compound may be employed.

DESCRIPTION OF PREFERRED EMBODIMENTS

The following examples illustrates embodiments of the invention, but it is not intended to limit the invention thereto.

EXAMPLE 1

(a) Preparation of the catalyst

In a stainless steel pot 400 ml in inner volume containing 25 stainless steel balls ½ inch in diameter were placed 10 g. of commercial grade anhydrous magnesium chloride, 2.1 g. of titanium tetrachloride, 0.5 g. of 1,2-dichloroethane and 0.5 g. of dimethylpolysiloxane with a viscosity of 100 centistokes. The mixture was ball milled under nitrogen at room temperature for 16 hours. Solid powders obtained after the ball milling contained 42 mg of titanium per gram of the solid.

(b) Polymerization

A 2-l. stainless steel autoclave equipped with an induction stirrer was flushed with nitrogen and provided with 1000 ml of hexane. To the autoclave were added 1 mmol of triisobutylaluminum and 10 mg of the above-obtained solid powders. The mixture was then heated with stirring to 85° C. The system in which vapor pressure of the hexane exerted 1.7 kg/cm²G was filled with hydrogen to a total pressure of 5.9 kg/cm²G. Ethylene was then charged to a total pressure of 10 kg/cm²G for initiation of the polymerization. Ethylene was continuously introduced so as to maintain a total pressure of 10 kg/cm²G. The polymerization was carried out for 1 hour. After completion of the polymerization, the resulting polymer slurry was transferred to a beaker, from which the hexane was removed under reduced pressure. There was obtained 235 g. of white polyethylene with a melt index of 0.81 and a bulk density of 0.39. The catalyst activity was 136,500 g.polyethylene/g.Ti.hr.$C_2H_4$ pressure, and 5,730 g.polyethylene/g.solid.hr.$C_2H_4$ pressure to indicate that polyethylene of a high bulk density was obtained in a very high activity. The polymer particles had an average size of 480μ, those of 100μ or below being 2% and those of 1000μ or over being 2%, particle features being good.

Comparative Example 1

In the same ball-mill pot as in Example 1 were placed 10 g. of anhydrous magnesium chloride and 2.1 g. of titanium tetrachloride. The mixture was ball milled under nitrogen at room temperature for 16 hours. One gram of the solid powders obtained after the ball milling contained 39 mg of titanium.

A polymerization was carried out by the same procedures as in Example 1 for 1 hour using 10 mg of the above-obtained solid powders. There was produced 68 g. of white polyethylene of a melt index of 0.72 and bulk density of 0.15. The catalyst activity was 42,530 g.polyethylene/g.Ti.hr.$C_2H_4$ pressure and 1,660 g.polyethylene/g.solid.hr.$C_2H_4$ pressure. The polymer contained 9% of particles of 100μ or below and 8% of particles of 1000μ or over. Both activity and particle features were inferior to those in Example 1.

Comparative Example 2

In the same ball-mill pot as in Example 1 were placed 10 g. of anhydrous magnesium chloride, 2.1 g. of titanium tetrachloride and 0.5 g. of 1,2-dichloroethane. The mixture was ball-milled under nitrogen at room temperature for 16 hours. One gram of the solid powders obtained after the ball milling contained 42 mg of titanium.

A polymerization was carried out by the same procedures as in Example 1 for 1 hour using 10 mg of the above-obtained solid powders. There was obtained 127 g. of white polyethylene of a melt index of 0.83 and a bulk density of 0.29. The catalyst activity was 73,750 g.polyethylene/g.Ti.hr.$C_2H_4$ pressure and 3,100 g.polyethylene/g.solid.hr.$C_2H_4$ pressure. The polymer contained 7% of particles of 100μ or below and 5% of particles of 1000μ or over. Both activity and particle features were inferior to those in Example 1.

Comparative Example 3

In the same ball-mill pot as in Example 1 were placed 10 g. of anhydrous magnesium chloride, 2 g. of titanium tetrachloride and 0.5 g. of methylpolysiloxane. The mixture was ball milled under nitrogen at room temperature for 16 hours. One gram of the solid powders obtained after the ball milling contained 40 mg. of titanium.

A polymerization was carried out by the same procedures as in Example 1 for 1 hour using 10 mg of the above-obtained solid powders. There was obtained 102 g. of white polyethylene of a melt index of 0.88 and a bulk density of 0.28. The catalyst activity was 62,200 g.polyethylene/g.Ti.hr.$C_2H_4$ pressure and 2,490 g.polyethylene/g.solid.hr.$C_2H_4$ pressure. The polymer contained 11% of particles of 100μ or below and 9% of particles of 1000μ or over. Both activity and particle features were inferior to those in Example 1.

EXAMPLE 2

In the same ball-mill pot as in Example 1 were placed 10 g. of anhydrous magnesium chloride, 3.6 g. of titanium trichloride reduced with metallic aluminum (manufactured by Toho Titanium), 0.5 g. of 1,2-dichloroethane and 0.5 g. of dimethylpolysiloxane. The mixture was ball milled under nitrogen at room temperature for 16 hours. One gram of the solid powders obtained after the ball milling contained 58 mg of titanium.

A polymerization was carried out for 1 hour by the same procedures as in Example 1 using 10 mg of the above-obtained solid powders. There was obtained 245 g. of white polyethylene of a melt index of 0.63 and a bulk density of 0.38. The catalyst activity was 103,000 g.polyethylene/g.Ti.hr.$C_2H_4$ pressure and 5,980 g.polyethylene/g.solid.hr.$C_2H_4$ pressure. The polymer particles had an average size of 530$\mu$, those of 100$\mu$ or below being 3% and those of 1000$\mu$ or over being 3% to indicate good particle feature.

Comparative Example 4

In the same ball-mill pot as in Example 1 were placed 10 g. of anhydrous magnesium chloride and 3.7 g. of titanium trichloride reduced with metallic aluminum. The mixture was ball milled under nitrogen at room temperature for 16 hours. One gram of the solid powders obtained after the ball milling contained 61 mg of titanium.

A polymerization was carried out for 1 hour by the same procedures as in Example 1 using 10 mg of the above-obtained solid powders. There was obtained 57 g. of white polyethylene of a melt index of 0.44 and a bulk density of 0.14. The catalyst activity was 22,790 g.polyethylene/g.Ti.hr.$C_2H_4$ pressure and 1,390 g.polyethylene/g.solid.hr.$C_2H_4$ pressure. The polymer contained 5% of particles of 100$\mu$ or below and 13% of particles of 1000$\mu$ or over. Both activity and particle features were inferior to those in Example 1.

Comparative Example 5

In the same ball-mill pot as in Example 1 were placed 10 g. of anhydrous magnesium chloride, 3.6 g. of titanium trichloride reduced with metallic aluminum and 0.5 g. of 1,2-dichloroethane. The mixture was ball-milled under nitrogen at room temperature for 16 hours. One gram of the solid powders obtained after the ball milling contained 59 mg of titanium.

A polymerization was carried out for 1 hour by the same procedures as in Example 1 using 10 mg of the above-obtained solid powders. There was obtained 131 g. of white polyethylene of a melt index of 0.49 and a bulk density of 0.28. The catalyst activity was 53,250 g.polyethylene/g.Ti.hr.$C_2H_4$ pressure and 3,200 g.polyethylene/g.solid.hr.$C_2H_4$ pressure. The polymer contained 3% of particles of 100$\mu$ or below and 43% of particles of 1000$\mu$ or over. Both activity and particle features were inferior to those in Example 1.

EXAMPLE 3

In the same ball-mill pot as in Example 1 were placed 10 g. of anhydrous magnesium chloride, 2.1 g. of titanium tetrachloride, 0.6 g. of tert.-butyl chloride and 0.6 g. of methylhydropolysiloxane. The mixture was ball milled under nitrogen at room temperature for 16 hours. One gram of the solid powders obtained after the ball milling contained 43 mg of titanium.

A polymerization was carried out for 1 hour by the same procedures as in Example 1 using 10 mg of the above-obtained solid powders. There was obtained 223 g. of white polyethylene of a melt index of 0.78 and a bulk density of 0.35. The catalytic activity was 126,500 g.polyethylene/g.Ti.hr.$C_2H_4$ pressure and 5,440 g.polyethylene/g.solid.hr.$C_2H_4$ pressure. The polymer particles had an average size of 520$\mu$, those of 100$\mu$ or below being 1% and those of 1000$\mu$ or over being 2% to indicate good particle features.

EXAMPLE 4

In the same ball-mill pot as in Example 1 were placed 10 g. of anhydrous magnesium chloride, 0.6 g. of isopropyl chloride and 0.6 g of methylphenylpolysiloxane. The mixture was ball milled under nitrogen at room temperature for 16 hours. One gram of the solid powders obtained after the ball milling contained 41 mg of titanium.

A polymerization was carried out for 1 hour by the same procedures as in Example 1 using 10 mg of the above-obtained solid powders. There was obtained 251 g. of white polyethylene of a melt index of 0.83 and a bulk density of 0.33. The catalytic activity was 149,300 g.polyethylene/g.Ti.hr.$C_2H_4$ pressure and 6,120 g.polyethylene/g.solid.hr.$C_2H_4$ pressure. The polymer particles had an average size of 580$\mu$, those of 100$\mu$ or below being 2% and those of 1000$\mu$ or over being 3% to indicate good particle features.

EXAMPLE 5

In the same ball-mill pot as in Example 1 were placed 10 g. of anhydrous magnesium chloride, 2 g. of titanium tetrachloride, 0.6 g. of phenyl chloride and 0.6 g. of tetramethylsiloxane. The mixture was ball milled under nitrogen at room temperature for 16 hours. One gram of the solid powders obtained after the ball milling contained 41 mg of titanium.

A polymerization was carried out for 1 hour by the same procedures as in Example 1 using 10 mg of the above-obtained solid powders. There was obtained 231 g. of white polyethylene of a melt index of 0.88 and a bulk density of 0.32. The catalytic activity was 137,400 g.polyethylene/g.Ti.hr.$C_2H_4$ pressure and 5,630 g.polyethylene/g.solid.hr.$C_2H_4$ pressure. The polymer particles had an average size of 570$\mu$, those of 100$\mu$ or below being 2% and those of 1000$\mu$ or over being 2% to indicate good particle features.

EXAMPLE 6

A 2-1. stainless steel autoclave equipped with an induction stirrer was flushed with nitrogen and provided with 1,000 ml of hexane. To the autoclave were added 1 mmol of triisobutylaluminum and 5 mg of the solid powders obtained in Example 1. The mixture was then heated with stirring to 85° C. The system in which vapor pressure of the hexane exerted 1.7 kg/cm$^2$G was filled with hydrogen to a total pressure of 5.9 kg/cm$^2$G. Ethylene-propylene mixed gas containing 2 mol% of propylene was then introduced, and the polymerization was conducted for 1 hour while maintaining pressure of the autoclave at 10 kg/cm$^2$G. After completion of the polymerization, the polymer slurry was transferred to a beaker, from which the hexane was removed under reduced pressure. There were obtained 148 g. of white polymer of a melt index of 1.2 and a bulk density of 0.34. The catalytic activity was 171,900 g. polymer/g.Ti.hr.$C_2H_4$ pressure and 7,220 g.polymer/g.solid.hr.$C_2H_4$ pressure. The polymer particles had an average size of 570$\mu$, those of 100$\mu$ or below being 1% and those of 1000$\mu$ or over being 2% to indicate good particle features.

We claim:

1. A process for the preparation of polyolefins by polymerizing olefins using a titanium containing solid component together with an organometallic compound, said solid component comprising a substance obtained by copulverizing (1) magnesium halide, maganese halide or mixtures thereof, (2) an organic halide compound which is a saturated or unsaturated aliphatic or aromatic hydrocarbon in which at least one of the hydrogens is substituted with halogen, (3) a chain or cyclic silicone compound with recurring structural units represented by the general formula:

wherein R' and R" respectively represent hydrogen, alkyl, aryl, alkoxy, or hydroxyl groups and (4) a tetravalent or trivalent titanium compound or mixtures thereof; the weight ratio of magnesium halide, maganese halide or mixtures thereof to organic halide being from 0.5:0.01 to 1:0.01; the weight ratio of magnesium halide, manganese halide or mixtures thereof to silicone compound being from 1:0.5 to 1:0.005; the amount of titanium compound in the solid component being from 0.5 to 10% by weight; said organometallic compound being selected from the group consisting of organoaluminum compounds of the general formulae $R_3Al$, $R_2AlX$, $RAlX_2$, $R_2AlOR$, $RAl(OR)X$ and $R_3Al_2X_3$ wherein R which may be the same or different in a specific compound is an alkyl or aryl group and X is a halogen atom, and organozinc compounds of the general formula $R_2Zn$ wherein R which may be the same or different in a specific compound is an alkyl group.

2. Process according to claim 1 wherein said magnesium halide is magnesium chloride.

3. Process according to claim 1 wherein said manganese halide is manganese chloride.

4. Process according to claim 1 wherein the olefin is ethylene, propylene or 1-butene.

5. Process according to claim 1 wherein said silicone compound is a polysiloxane having a viscosity at 25° C. from 1 to $10^6$ centistokes.

6. Process according to claim 1 wherein the trivalent titanium compound is a compound selected from the group consisting of titanium halides obtained by reducing titanium tetrahalides with hydrogen, aluminum, titanium or an organometal compound, and compounds obtained by reducing the tetravalent halogenated alkoxytitanium.

7. Process according to claim 1 wherein the tetravalent titanium compound is a compound selected from the group consisting of titanium tetrachloride, titanium tetrabromide, titanium tetraiodide, monoethoxytrichlorotitanium, diethoxydichlorotitanium, triethoxymonochlorotitanium, tetraethoxytitanium, monoisopropoxytrichlorotitanium, diisopropoxydichlorotitanium, tetraisopropoxytitanium, and reaction products of silicone tetrachloride and titanium alkoxides.

8. Process according to claim 1 wherein a vanadium compound is employed in combination with said titanium compound in a V/Ti molar ratio from 2/1 to 0.01/1.

9. Process according to claim 1 wherein the silicone compound is a compound selected from the group consisting of tetramethyl-disiloxane, tetramethylcyclotetrasiloxane, octamethyltrisiloxane, octaethylcyclotetrasiloxane, hexaphenylcyclotrisiloxane, methylhydropolysiloxane, ethylhydropolysiloxane, dimethylpolysiloxane, diethylpolysiloxane, methylethylpolysiloxane, methylphenylpolysiloxane, methylbenzylpolysiloxane and dietkyoxypolysiloxane.

10. Process according to claim 1 wherein said copulverization is carried out at a temperature from 0° to 200° C. for a period from 0.5 to 50 hours.

11. Process according to claim 1 wherein said polymerization is carried out at a temperature from 20° to 120° C. and a pressure from atmospheric pressure to 70 kg/cm²G.

12. Process according to claim 1 wherein said polymerization is carried out in the presence of hydrogen.

13. Process according to claim 1 wherein the organic halide compound is a compound selected from the group consisting of methylene chloride, chloroform, carbon tetrachloride, bromochloromethane, dichlorodifluoromethane, 1-bromo-2-chloroethane, 1,2-dibromo-1,1-dichloroethane, 1,1-dichloroethane, 1,2-dichloroethane, 1,2-dichloro-1,1,2,2-tetracluoroethane, 1,1,2,2-tetrachloroethane, 1.1.1-trichloroethane, 1,1,2-trichloroethane, 1-chloropropane, 2-chloropropane, 1,2-dichloropropane, 1,3-dichloropropane, 2,2,-dichloropropane, 1,1,1,2,2,3,3-heptachloropropane, 1,1,2,2,3,3,3-hexachloropropane, octachloropropane, 1,1,2-trichloropropane, 1-chlorobutane, 2-chlorobutane, 1-chloro-2-methylpropane, 2-chloro-2-methylpropane, 1,2-dichlorobutane, 1,3-dichlorobutane, 1,4-dichlorobutane, 2,2-dichlorobutane, 1-chloropentane, 1-chlorohexane, 1-chloroheptane, 1-chlorooctane, 1-chlorononane, 1-chlorodecane, vinyl chloride, 1,1-dichloroethylene, 1,2-dichloroethylene, tetrachloroethylene, 3-chloro-1-propane, 1,3-dichloropropene, chloropropane, oleyl chloride, chlorobenzene, chloronaphthalene, benzyl chloride, benzylidene chloride, chloroethylbenzene, styrene dichloride and α-chlorocumene.

14. Process according to claim 1 wherein the weight ratio of the mangesium halide, manganese halide or mixture thereof to the silicone compound is from 1:03 to 1:0.01.

15. Process according to claim 1 wherein the solid component contains titanium in an amount ranging from 1 to 8% by weight.

* * * * *